(12) United States Patent
Wang et al.

(10) Patent No.: US 10,313,044 B2
(45) Date of Patent: Jun. 4, 2019

(54) DATA TRANSMISSION METHOD, DEVICE, AND SYSTEM

(71) Applicant: Huawei Technologies Co., Ltd., Shenzhen (CN)

(72) Inventors: Da Wang, Beijing (CN); Jian Wang, Beijing (CN)

(73) Assignee: Hauwei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/525,009

(22) PCT Filed: Nov. 7, 2014

(86) PCT No.: PCT/CN2014/090565
§ 371 (c)(1),
(2) Date: May 5, 2017

(87) PCT Pub. No.: WO2016/070405
PCT Pub. Date: May 12, 2016

(65) Prior Publication Data
US 2017/0324502 A1    Nov. 9, 2017

(51) Int. Cl.
*H04J 13/10* (2011.01)
*H04W 72/04* (2009.01)
(Continued)

(52) U.S. Cl.
CPC .......... *H04J 13/10* (2013.01); *H04B 1/70712* (2013.01); *H04B 7/1858* (2013.01);
(Continued)

(58) Field of Classification Search
CPC ........ H04J 13/10; H04J 11/00; H04W 72/042; H04W 72/0413; H04W 16/00;
(Continued)

(56) References Cited

U.S. PATENT DOCUMENTS

2005/0286405 A1   12/2005   Sun et al.
2008/0187057 A1*  8/2008    Qu .................... H04L 25/03866
                                                              375/260
(Continued)

FOREIGN PATENT DOCUMENTS

CN   102090012 A   6/2011
CN   103686893 A   3/2014
(Continued)

OTHER PUBLICATIONS

"3rd Generation Partnership Project; Technical Specification Group Radio Access Network; Evolved Universal Terrestrial Radio Access (E-UTRA); Physical channels and modulation (Release 12)," 3GPP TS 36.211 V12.3.0, pp. 1-124, 3rd Generation Partnership Project, Valbonne, France (Sep. 2014).

(Continued)

*Primary Examiner* — Faisal Choudhury
(74) *Attorney, Agent, or Firm* — Leydig, Voit & Mayer, Ltd.

(57) ABSTRACT

The present invention relates to the communications field, and discloses a data transmission method, a device, and a system, so as to resolve a problem in the prior art that user equipment cannot correctly parse data or measure a channel due to incapability of identifying different operators. A specific solution is: obtaining a scrambling code sequence, where the scrambling code sequence is generated according to a specific sequence of an operator to which a first device belongs; scrambling data according to the scrambling code sequence to obtain the scrambled data; and sending the scrambled data. The present invention is used for data transmission.

14 Claims, 4 Drawing Sheets

(51) Int. Cl.
  *H04B 1/707* (2011.01)
  *H04B 7/185* (2006.01)
  *H04J 11/00* (2006.01)
  *H04W 16/00* (2009.01)
  *H04W 48/16* (2009.01)
  *H04L 1/00* (2006.01)

(52) U.S. Cl.
  CPC ........... *H04J 11/00* (2013.01); *H04W 72/042* (2013.01); *H04W 72/0413* (2013.01); *H04L 1/0061* (2013.01); *H04W 16/00* (2013.01); *H04W 48/16* (2013.01)

(58) Field of Classification Search
  CPC . H04W 48/16; H04B 1/70412; H04B 7/1858; H04L 1/0061
  USPC .......................................................... 370/342
  See application file for complete search history.

(56) References Cited

U.S. PATENT DOCUMENTS

| | | | |
|---|---|---|---|
| 2008/0187069 A1* | 8/2008 | Qu ...................... | H04L 27/2615 375/295 |
| 2010/0172235 A1 | 7/2010 | Liu et al. | |
| 2011/0122789 A1 | 5/2011 | Haustein et al. | |
| 2013/0196693 A1 | 8/2013 | Vanderveen et al. | |
| 2014/0213263 A1 | 7/2014 | Ryan et al. | |
| 2015/0011223 A1 | 1/2015 | Wang et al. | |
| 2015/0016369 A1* | 1/2015 | Park ...................... | H04B 7/024 370/329 |
| 2015/0098349 A1* | 4/2015 | Wei ...................... | H04W 16/14 370/252 |
| 2015/0117291 A1* | 4/2015 | Seo ........................ | H04L 5/001 370/312 |
| 2015/0172006 A1* | 6/2015 | Wang .................... | H04L 1/0073 370/329 |
| 2015/0282183 A1* | 10/2015 | Sverdlov ........... | H04L 25/03866 370/329 |
| 2017/0013612 A1 | 1/2017 | Nayeb Nazar et al. | |
| 2017/0237586 A1 | 8/2017 | Liu et al. | |
| 2017/0289936 A1* | 10/2017 | Chae .................... | H04W 56/001 |

FOREIGN PATENT DOCUMENTS

| | | |
|---|---|---|
| CN | 104094650 A | 10/2014 |
| EP | 3065482 A1 | 9/2016 |
| EP | 3206435 A1 | 8/2017 |
| JP | 2008504789 A | 2/2008 |
| JP | 2013507067 A | 2/2013 |
| JP | 2016536851 A | 11/2016 |
| KR | 20100081933 | 7/2010 |
| WO | 2011041598 A2 | 4/2011 |
| WO | 2011041623 A1 | 4/2011 |
| WO | 2013026323 A1 | 2/2013 |
| WO | 2014048296 A1 | 4/2014 |
| WO | 2014067101 A1 | 5/2014 |
| WO | 2015050719 A2 | 4/2015 |
| WO | 2016065553 A1 | 5/2016 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol Specification (Release 10)," 3GPP TS 36.331 V10.14.0, pp. 1-312, 3rd Generation Partnership Project, Valbonne, France (Sep. 2014).

"On Gold Sequence Initialization," 3GPP TSG RAN WG1 Meeting #52bis, Shenzhen, China, R1-081229, 3rd Generation Partnership Project, Valbonne, France (Mar. 31-Apr. 4, 2008).

* cited by examiner

DATA TRANSMISSION METHOD, DEVICE, AND SYSTEM

CROSS-REFERENCE TO RELATED APPLICATIONS

This application is a national stage of International Application No. PCT/CN2014/090565, filed on Nov. 7, 2014, which is hereby incorporated by reference in its entirety.

TECHNICAL FIELD

The present invention relates to the communications field, and in particular, to a data transmission method, a device, and a system.

BACKGROUND

In a wireless network system, different operators own different spectrums. These dedicated spectrums provide services to only specific operators, and therefore are referred to as licensed spectrums. Each operator has a specific planned spectrum, and different operators do not conflict with each other. Correspondingly, some spectrums do not provide services to a specific operator, and the spectrums that have not been planned are referred to as unlicensed spectrums. With development of communications technologies, to better satisfy user requirements, multiple operators start to use unplanned spectrums to transmit data, so as to improve a system throughput. However, because all operators can use unlicensed spectrums, different operators preempt a same physical resource when multiple operators transmit data in a same unlicensed spectrum. Therefore, in an unlicensed spectrum, user equipment may simultaneously receive data or reference signals sent by two or more different operators. Consequently, the user equipment cannot correctly parse the data or measure a channel due to incapability of identifying the different operators.

SUMMARY

Embodiments of the present invention provide a data transmission method, a device, and a system, so as to resolve a problem in the prior art that user equipment cannot correctly parse data or measure a channel due to incapability of identifying different operators.

To achieve the foregoing objective, the following technical solutions are used in the embodiments of the present invention.

According to a first aspect, an embodiment of the present invention provides a data transmission method, including:

obtaining, by a first device, a scrambling code sequence, where the scrambling code sequence is generated according to a specific sequence of an operator to which the first device belongs;

scrambling, by the first device, data according to the scrambling code sequence; and sending, by the first device, the scrambled data.

With reference to the first aspect, in a first possible implementation manner of the first aspect, the obtaining, by a first device, a scrambling code sequence includes:

generating, by the first device, a scrambling code seed according to the specific sequence of the operator to which the first device belongs, and generating the scrambling code sequence according to the scrambling code seed.

With reference to the first possible implementation manner of the first aspect, in a second possible implementation manner of the first aspect, the generating, by the first device, a scrambling code seed according to the specific sequence of the operator to which the first device belongs includes:

representing, by the first device, the specific sequence of the operator to which the first device belongs as a k-bit binary number to be used as k bits of the scrambling code seed, where remaining bits of the scrambling code seed are 0, the scrambling code seed totally includes 31 bits, and k is an integer falling within a range of (0, 31].

With reference to the first possible implementation manner of the first aspect, in a third possible implementation manner of the first aspect, the generating, by the first device, a scrambling code seed according to the specific sequence of the operator to which the first device belongs includes:

generating, by the first device, the scrambling code seed according to the specific sequence of the operator to which the first device belongs and a cell-specific sequence of the first device.

With reference to the first possible implementation manner of the first aspect, in a fourth possible implementation manner of the first aspect, the method further includes:

sending, by the first device, the scrambling code seed.

With reference to any one of the implementation manners of the first aspect to the fourth possible implementation manner of the first aspect, in a fifth possible implementation manner of the first aspect, the data is a cyclic redundancy check code CRC.

With reference to any one of the implementation manners of the first aspect to the fifth possible implementation manner of the first aspect, in a sixth possible implementation manner of the first aspect, the specific sequence of the operator to which the first device belongs includes a mobile network code MNC and/or a mobile country code MCC.

With reference to any one of the implementation manners of the first aspect to the sixth possible implementation manner of the first aspect, in a seventh possible implementation manner of the first aspect, the data is data on a physical broadcast channel PBCH, a physical downlink shared channel PDSCH, a physical downlink control channel PDCCH, a physical control format indicator channel PCFICH, a physical multicast channel PMCH, a cell-specific reference signal CRS, an enhanced physical downlink control channel EPDCCH, a demodulation reference signal DM-RS, a positioning reference signal PRS, a channel state information-reference signal CSI-RS, a physical uplink shared channel PUSCH, a physical uplink control channel PUCCH, a sounding reference signal SRS, or a demodulation reference signal DM-RS for a physical uplink shared channel.

With reference to any one of the implementation manners of the first aspect to the seventh possible implementation manner of the first aspect, in an eighth possible implementation manner of the first aspect, the first device is a base station or user equipment.

According to a second aspect, an embodiment of the present invention provides a data transmission method, including:

obtaining, by a second device, a scrambling code sequence, where the scrambling code sequence is generated according to a specific sequence of an operator to which the second device belongs;

receiving, by the second device, scrambled data; and descrambling, by the second device, the scrambled data according to the scrambling code sequence.

With reference to the second aspect, in a first possible implementation manner of the second aspect, the obtaining, by a second device, a scrambling code sequence includes:

generating, by the second device, a scrambling code seed according to the specific sequence of the operator to which the second device belongs, and generating the scrambling code sequence according to the scrambling code seed.

With reference to the first possible implementation manner of the second aspect, in a second possible implementation manner of the second aspect, the generating, by the second device, a scrambling code seed according to the specific sequence of the operator to which the second device belongs includes:

representing, by the second device, the specific sequence of the operator to which the second device belongs as a k-bit binary number to be used as k bits of the scrambling code seed, where remaining bits of the scrambling code seed are 0, the scrambling code seed totally includes 31 bits, and k is an integer falling within a range of (0, 31].

With reference to the first possible implementation manner of the second aspect, in a third possible implementation manner of the second aspect, the generating, by the second device, a scrambling code seed according to the specific sequence of the operator to which the second device belongs includes:

generating, by the second device, the scrambling code seed according to the specific sequence of the operator to which the second device belongs and a cell-specific sequence of the second device.

With reference to the second aspect, in a fourth possible implementation manner of the second aspect, the obtaining, by a second device, a scrambling code sequence includes:

receiving, by the second device, a scrambling code seed, and generating the scrambling code sequence according to the scrambling code seed.

With reference to any one of the implementation manners of the second aspect to the fourth possible implementation manner of the second aspect, in a fifth possible implementation manner of the second aspect, the data is a cyclic redundancy check code CRC.

With reference to any one of the implementation manners of the second aspect to the fifth possible implementation manner of the second aspect, in a sixth possible implementation manner of the second aspect, the specific sequence of the operator to which the second device belongs includes a mobile network code MNC and/or a mobile country code MCC.

With reference to any one of the implementation manners of the second aspect to the sixth possible implementation manner of the second aspect, in a seventh possible implementation manner of the second aspect, the data is data on a physical broadcast channel PBCH, a physical downlink shared channel PDSCH, a physical downlink control channel PDCCH, a physical control format indicator channel PCFICH, a physical multicast channel PMCH, a cell-specific reference signal CRS, an enhanced physical downlink control channel EPDCCH, a demodulation reference signal DM-RS, a positioning reference signal PRS, a channel state information-reference signal CSI-RS, a physical uplink shared channel PUSCH, a physical uplink control channel PUCCH, a sounding reference signal SRS, or a demodulation reference signal DM-RS for a physical uplink shared channel.

With reference to any one of the implementation manners of the second aspect to the seventh possible implementation manner of the second aspect, in an eighth possible implementation manner of the second aspect, the second device is a base station or user equipment.

According to a third aspect, an embodiment of the present invention provides a first device, including:

a scrambling code unit, configured to obtain a scrambling code sequence, where the scrambling code sequence is generated according to a specific sequence of an operator to which the first device belongs;

a data processing unit, configured to scramble data according to the scrambling code sequence obtained by the scrambling code unit; and a sending unit, configured to send the data scrambled by the data processing unit.

With reference to the third aspect, in a first possible implementation manner of the third aspect, the scrambling code unit is specifically configured to: generate a scrambling code seed according to the specific sequence of the operator to which the first device belongs, and generate the scrambling code sequence according to the scrambling code seed.

With reference to the first possible implementation manner of the third aspect, in a second possible implementation manner of the third aspect, the scrambling code unit is further specifically configured to represent the specific sequence of the operator to which the first device belongs as a k-bit binary number to be used as k bits of the scrambling code seed, where remaining bits of the scrambling code seed are 0, the scrambling code seed totally includes 31 bits, and k is an integer falling within a range of (0, 31].

With reference to the first possible implementation manner of the third aspect, in a third possible implementation manner of the third aspect, the scrambling code unit is further specifically configured to generate the scrambling code seed according to the specific sequence of the operator to which the first device belongs and a cell-specific sequence of the first device.

With reference to the first possible implementation manner of the third aspect, in a fourth possible implementation manner of the third aspect, the sending unit is further configured to send the scrambling code seed.

With reference to any one of the implementation manners of the third aspect to the fourth possible implementation manner of the third aspect, in a fifth possible implementation manner of the third aspect, the data is a cyclic redundancy check code CRC.

With reference to any one of the implementation manners of the third aspect to the fifth possible implementation manner of the third aspect, in a sixth possible implementation manner of the third aspect, the specific sequence of the operator to which the first device belongs includes a mobile network code MNC and/or a mobile country code MCC.

With reference to any one of the implementation manners of the third aspect to the sixth possible implementation manner of the third aspect, in a seventh possible implementation manner of the third aspect, the data is data on a physical broadcast channel PBCH, a physical downlink shared channel PDSCH, a physical downlink control channel PDCCH, a physical control format indicator channel PCFICH, a physical multicast channel PMCH, a cell-specific reference signal CRS, an enhanced physical downlink control channel EPDCCH, a demodulation reference signal DM-RS, a positioning reference signal PRS, a channel state information-reference signal CSI-RS, a physical uplink shared channel PUSCH, a physical uplink control channel PUCCH, a sounding reference signal SRS, or a demodulation reference signal DM-RS for a physical uplink shared channel.

With reference to any one of the implementation manners of the third aspect to the seventh possible implementation manner of the third aspect, in an eighth possible implementation manner of the third aspect, the first device is a base station or user equipment.

According to a fourth aspect, an embodiment of the present invention provides a second device, including:

a scrambling code unit, configured to obtain a scrambling code sequence, where the scrambling code sequence is generated according to a specific sequence of an operator to which the second device belongs;

a receiving unit, configured to receive scrambled data; and a data processing unit, configured to descramble, according to the scrambling code sequence obtained by the scrambling code unit, the scrambled data received by the receiving unit.

With reference to the fourth aspect, in a first possible implementation manner of the fourth aspect, the scrambling code unit is specifically configured to: generate a scrambling code seed according to the specific sequence of the operator to which the second device belongs, and generate the scrambling code sequence according to the scrambling code seed.

With reference to the first possible implementation manner of the fourth aspect, in a second possible implementation manner of the fourth aspect, the scrambling code unit is further specifically configured to represent the specific sequence of the operator to which the second device belongs as a k-bit binary number to be used as k bits of the scrambling code seed, where remaining bits of the scrambling code seed are 0, the scrambling code seed totally includes 31 bits, and k is an integer falling within a range of (0, 31].

With reference to the first possible implementation manner of the fourth aspect, in a third possible implementation manner of the fourth aspect, the scrambling code unit is further specifically configured to generate the scrambling code seed according to the specific sequence of the operator to which the second device belongs and a cell-specific sequence of the second device.

With reference to the fourth aspect, in a fourth possible implementation manner of the fourth aspect, the receiving unit is further configured to receive a scrambling code seed; and the scrambling code unit, is further configured to generate the scrambling code sequence according to the scrambling code seed received by the receiving unit.

With reference to any one of the implementation manners of the fourth aspect to the fourth possible implementation manner of the fourth aspect, in a fifth possible implementation manner of the fourth aspect, the data is a cyclic redundancy check code CRC.

With reference to any one of the implementation manners of the fourth aspect to the fifth possible implementation manner of the fourth aspect, in a sixth possible implementation manner of the fourth aspect, the specific sequence of the operator to which the second device belongs includes a mobile network code MNC and/or a mobile country code MCC.

With reference to any one of the implementation manners of the fourth aspect to the sixth possible implementation manner of the fourth aspect, in a seventh possible implementation manner of the fourth aspect, the data is data on a physical broadcast channel PBCH, a physical downlink shared channel PDSCH, a physical downlink control channel PDCCH, a physical control format indicator channel PCFICH, a physical multicast channel PMCH, a cell-specific reference signal CRS, an enhanced physical downlink control channel EPDCCH, a demodulation reference signal DM-RS, a positioning reference signal PRS, a channel state information-reference signal CSI-RS, a physical uplink shared channel PUSCH, a physical uplink control channel PUCCH, a sounding reference signal SRS, or a demodulation reference signal DM-RS for a physical uplink shared channel.

With reference to any one of the implementation manners of the fourth aspect to the seventh possible implementation manner of the fourth aspect, in an eighth possible implementation manner of the fourth aspect, the second device is a base station or user equipment.

According to a fifth aspect, an embodiment of the present invention provides a first device, including a processor, a memory, a bus, and a transmitter, where the processor, the memory, and the transmitter are connected to each other by using the bus, where the processor is configured to obtain a scrambling code sequence, and scramble data according to the scrambling code sequence, where the scrambling code sequence is generated according to a specific sequence of an operator to which the first device belongs; and the transmitter is configured to send the data scrambled by the processor.

With reference to the fifth aspect, in a first possible implementation manner of the fifth aspect, the processor is specifically configured to: generate a scrambling code seed according to the specific sequence of the operator to which the first device belongs, and generate the scrambling code sequence according to the scrambling code seed.

With reference to the first possible implementation manner of the fifth aspect, in a second possible implementation manner of the fifth aspect, the processor is further specifically configured to represent the specific sequence of the operator to which the first device belongs as a k-bit binary number to be used as k bits of the scrambling code seed, where remaining bits of the scrambling code seed are 0, the scrambling code seed totally includes 31 bits, and k is an integer falling within a range of (0, 31].

With reference to the first possible implementation manner of the fifth aspect, in a third possible implementation manner of the fifth aspect, the processor is further specifically configured to generate the scrambling code seed according to the specific sequence of the operator to which the first device belongs and a cell-specific sequence of the first device.

With reference to the first possible implementation manner of the fifth aspect, in a fourth possible implementation manner of the fifth aspect, the transmitter is further configured to send the scrambling code seed.

With reference to any one of the implementation manners of the fifth aspect to the fourth possible implementation manner of the fifth aspect, in a fifth possible implementation manner of the fifth aspect, the data is a cyclic redundancy check code CRC.

With reference to any one of the implementation manners of the fifth aspect to the fifth possible implementation manner of the fifth aspect, in a sixth possible implementation manner of the fifth aspect, the specific sequence of the operator to which the first device belongs includes a mobile network code MNC and/or a mobile country code MCC.

With reference to any one of the implementation manners of the fifth aspect to the sixth possible implementation manner of the fifth aspect, in a seventh possible implementation manner of the fifth aspect, the data is data on a physical broadcast channel PBCH, a physical downlink shared channel PDSCH, a physical downlink control channel PDCCH, a physical control format indicator channel PCFICH, a physical multicast channel PMCH, a cell-specific reference signal CRS, an enhanced physical downlink control channel EPDCCH, a demodulation reference signal DM-RS, a positioning reference signal PRS, a channel state information-reference signal CSI-RS, a physical uplink shared channel PUSCH, a physical uplink control channel PUCCH, a sounding reference signal SRS, or a demodulation reference signal DM-RS for a physical uplink shared channel.

With reference to any one of the implementation manners of the fifth aspect to the seventh possible implementation manner of the fifth aspect, in an eighth possible implementation manner of the fifth aspect, the first device is a base station or user equipment.

According to a sixth aspect, an embodiment of the present invention provides a second device, including a processor, a memory, a bus, and a receiver, where the processor, the memory, and the receiver are connected to each other by using the bus, where the processor is configured to obtain a scrambling code sequence, where the scrambling code sequence is generated according to a specific sequence of an operator to which the second device belongs;

the receiver is configured to receive scrambled data; and the processor is further configured to demodulate, according to the obtained scrambling code sequence, the scrambled data received by the receiver.

With reference to the sixth aspect, in a first possible implementation manner of the sixth aspect, the processor is specifically configured to: generate a scrambling code seed according to the specific sequence of the operator to which the second device belongs, and generate the scrambling code sequence according to the scrambling code seed.

With reference to the first possible implementation manner of the sixth aspect, in a second possible implementation manner of the sixth aspect, the processor is further specifically configured to represent the specific sequence of the operator to which the second device belongs as a k-bit binary number to be used as k bits of the scrambling code seed, where remaining bits of the scrambling code seed are 0, the scrambling code seed totally includes 31 bits, and k is an integer falling within a range of (0, 31].

With reference to the first possible implementation manner of the sixth aspect, in a third possible implementation manner of the sixth aspect, the processor is further specifically configured to generate the scrambling code seed according to the specific sequence of the operator to which the second device belongs and a cell-specific sequence of the second device.

With reference to the sixth aspect, in a fourth possible implementation manner of the sixth aspect, the receiver is further configured to receive a scrambling code seed; and the processor is further configured to generate the scrambling code sequence according to the scrambling code seed received by the receiver.

With reference to any one of the implementation manners of the sixth aspect to the fourth possible implementation manner of the sixth aspect, in a fifth possible implementation manner of the sixth aspect, the data is a cyclic redundancy check code CRC.

With reference to any one of the implementation manners of the sixth aspect to the fifth possible implementation manner of the sixth aspect, in a sixth possible implementation manner of the sixth aspect, the specific sequence of the operator to which the second device belongs includes a mobile network code MNC and/or a mobile country code MCC.

With reference to any one of the implementation manners of the sixth aspect to the sixth possible implementation manner of the sixth aspect, in a seventh possible implementation manner of the sixth aspect, the data is data on a physical broadcast channel PBCH, a physical downlink shared channel PDSCH, a physical downlink control channel PDCCH, a physical control format indicator channel PCFICH, a physical multicast channel PMCH, a cell-specific reference signal CRS, an enhanced physical downlink control channel EPDCCH, a demodulation reference signal DM-RS, a positioning reference signal PRS, a channel state information-reference signal CSI-RS, a physical uplink shared channel PUSCH, a physical uplink control channel PUCCH, a sounding reference signal SRS, or a demodulation reference signal DM-RS for a physical uplink shared channel.

With reference to any one of the implementation manners of the sixth aspect to the seventh possible implementation manner of the sixth aspect, in an eighth possible implementation manner of the sixth aspect, the second device is a base station or user equipment.

According to a seventh aspect, an embodiment of the present invention provides a wireless network system, including a first device and a second device, where the first device is the first device described in any one of the implementation manners of the third aspect to the eighth possible implementation manner of the third aspect, and the second device is the second device described in any one of the fourth aspect to the eighth possible implementation manner of the fourth aspect; or the first device is the first device described in any one of the implementation manners of the fifth aspect to the eighth possible implementation manner of the fifth aspect, and the second device is the second device described in any one of the sixth aspect to the eighth possible implementation manner of the sixth aspect.

According to the data transmission method, the device, and the system that are provided in the embodiments of the present invention, data is scrambled by using a scrambling code sequence that is generated according to a specific sequence of an operator to which a first device belongs. In this way, user equipment performs descrambling according to the corresponding scrambling code sequence, and data of another operator cannot be correctly descrambled and therefore can be directly discarded. Data of different operators is distinguished. Therefore, a problem that user equipment cannot correctly parse data or measure a channel due to incapability of identifying different operators is resolved.

BRIEF DESCRIPTION OF DRAWINGS

To describe the technical solutions in the embodiments of the present invention more clearly, the following briefly describes the accompanying drawings for describing the embodiments. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are merely some but not all of the embodiments of the present invention. All other embodiments obtained by a person of ordinary skill in the art based on the embodiments of the present invention without creative efforts shall fall within the protection scope of the present invention.

Figure 1:
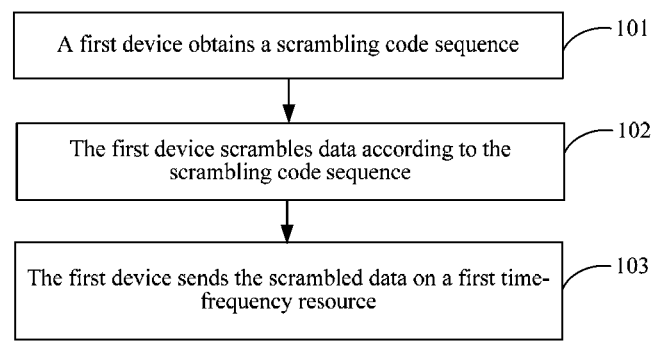
FIG. 1 is a schematic flowchart of a data transmission method according to an embodiment of the present invention.

An embodiment of the present invention provides a data transmission method. Optionally, the data transmission method is applicable to a first device in a wireless network. Optionally, the first device may be a base station or user equipment. Certainly, the first device may be another network device. This is not limited in the present invention. In the present invention, the name of the first device is only used for convenience of distinguishing, but is not used to limit the device. Referring to FIG. 1, the data transmission method provided in this embodiment includes the following steps.

101: The first device obtains a scrambling code sequence.

The scrambling code sequence is generated according to a specific sequence of an operator to which the first device belongs. The specific sequence of the operator to which the first device belongs is used to indicate that data to be transmitted is data of the operator to which the first device belongs.

Preferably, a scrambling code seed may be generated according to the specific sequence of the operator to which the first device belongs, and the scrambling code sequence is generated according to the scrambling code seed. The first device may further send the scrambling code seed to a receiving device, so that the receiving device generates a scrambling code sequence according to the scrambling code seed and then descrambles received data.

Optionally, the specific sequence of the operator to which the first device belongs may be an ID (identity) of the operator to which the first device belongs. The ID of the operator to which the first device belongs may include an MNC (mobile network code), or the ID of the operator to which the first device belongs includes an MNC and an MCC (mobile country code).

102: The first device scrambles data according to the scrambling code sequence.

Preferably, the data may be scrambled according to the scrambling code sequence and a first formula. The first formula is $B(i)=(b(i)+c(i))\mod 2$. $B(i)$ is a value of an $i^{th}$ bit of the scrambled data, $b(i)$ is a value of an $i^{th}$ bit of the unscrambled data, $c(i)$ is a value of an $i^{th}$ bit of the scrambling code sequence, and $i$ is an integer greater than or equal to 0. mod 2 represents performing a binary modulo-2 operation on two numbers. That is, no carry is produced during binary calculation. For example, "1+1=0", "0+1=1", and "0+0=0". Certainly, the first formula is used herein merely as an example for description, and it does not represent that the scrambling can be performed by using only the first formula in the present invention. For details about how to perform scrambling and for a scrambling algorithm to be used, no limitation is imposed in the present invention.

103: The first device sends the scrambled data.

Optionally, the first device may further send the scrambling code seed or the scrambling code sequence. Optionally, the first device sends the scrambled data on a first time-frequency resource. The first time-frequency resource may be a time-frequency resource shared by the operator to which the first device belongs and another operator.

According to the data transmission method provided in this embodiment of the present invention, data is scrambled by using a scrambling code sequence that is generated according to a specific sequence of an operator to which a first device belongs. In this way, user equipment performs descrambling according to the corresponding scrambling code sequence, and data of another operator cannot be correctly descrambled and therefore can be directly discarded. Data of different operators is distinguished. Therefore, a problem that user equipment cannot correctly parse data or measure a channel due to incapability of identifying different operators is resolved.

Figure 2:
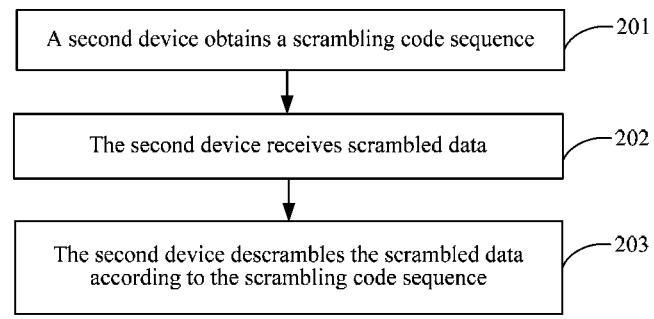
FIG. 2 is a schematic flowchart of another data transmission method according to an embodiment of the present invention.

Corresponding to the embodiment that corresponds to FIG. 1 above, an embodiment of the present invention provides another data transmission method. Optionally, the data transmission method is applied to a second device. Optionally, the second device may be a base station or user equipment. In the present invention, the name of the second device is only used for convenience of distinguishing, but is not used to limit the device. Referring to FIG. 2, the following steps are included.

201: The second device obtains a scrambling code sequence.

The scrambling code sequence is generated according to a specific sequence of an operator to which the second device belongs. The specific sequence of the operator to which the second device belongs is used to indicate that scrambled data is data of the operator to which the second device belongs.

Preferably, a first device and the second device belong to a same operator. The second device may receive the scrambling code sequence sent by the first device, or receive a scrambling code seed sent by the first device, or receive a scrambling code seed sent by a third party device, or obtain a prestored scrambling code seed. Preferably, the scrambling code seed may be generated by the first device according to the specific sequence of the operator to which the second device belongs. The first device and the second device belong to a same operator. The second device generates the scrambling code sequence according to the received scrambling code seed. Alternatively, the second device generates a scrambling code seed according to the specific sequence of the operator to which the second device belongs, and generates the scrambling code sequence according to the scrambling code seed.

202: The second device receives scrambled data.

Preferably, the second device receives the scrambled data that is sent by the first device on a first time-frequency resource. The first device and the second device belong to a same operator. The first time-frequency resource is a time-frequency resource shared by the operator to which the second device belongs and another operator.

203: The second device descrambles the scrambled data according to the scrambling code sequence.

According to the data transmission method provided in this embodiment of the present invention, received scrambled data is scrambled according to a scrambling code sequence that is generated according to a specific sequence of an operator to which a second device belongs. In this way, user equipment performs descrambling according to the corresponding scrambling code sequence, and data of another operator cannot be correctly descrambled and therefore can be directly discarded. Operators are distinguished. Therefore, a problem that user equipment cannot correctly parse data or measure a channel due to incapability of identifying different operators is resolved.

Based on the embodiments that correspond to FIG. 1 and FIG. 2 above, another embodiment of the present invention provides a data transmission method. The data transmission method is applied to the first device and the second device in the embodiments that correspond to FIG. 1 and FIG. 2 above. Optionally, in a wireless network to which the first device and the second device belong, the first device and the second device belong to a same operator. The operator to which the first device and the second device belong and another operator share a first time-frequency resource. In this embodiment, that the first device and the second device belong to a same operator is used as an example for description. In the present invention, the names of the first device and the second device are only used for convenience of distinguishing, but are not used to limit the devices. Preferably, the first time-frequency resource may be a time-frequency resource in an unlicensed spectrum. A specific form of the first time-frequency resource is not limited in the present invention.

Figure 3:
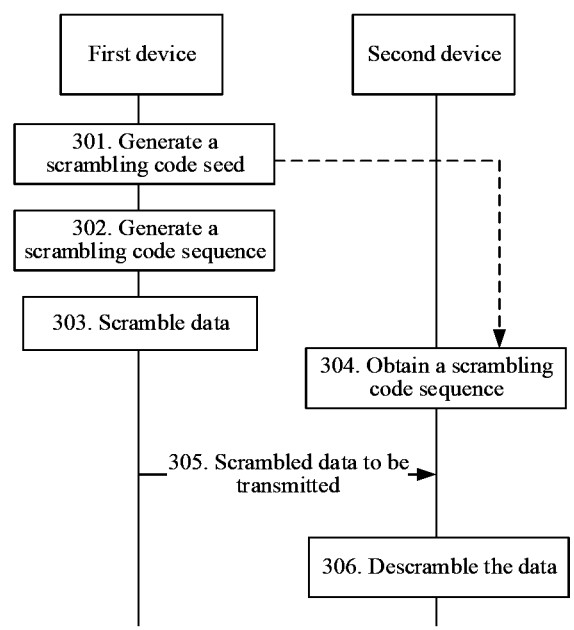
FIG. 3 is a schematic diagram of information exchange in a data transmission method according to another embodiment of the present invention.

Preferably, the first device and the second device may be network side devices, for example, eNBs (evolved Node B) in an LTE (Long Term Evolution) system. Alternatively, the first device is a network side device, and the second device is user equipment. Alternatively, the first device and the second device are both user equipment. In this case, the first device and the second device communicate in a D2D (device to device) manner. Certainly, it is only an example for description herein, and it does not represent that the present invention is limited thereto. Referring to FIG. 3, the data transmission method provided in this embodiment includes the following steps.

301: The first device generates a scrambling code seed according to a specific sequence of an operator to which the first device belongs.

Optionally, the specific sequence of the operator to which the first device belongs may be an ID of the first operator. The ID of the first operator may include an MNC, or the ID of the operator to which the first device belongs includes an MNC and a mobile country code MCC. Preferably, the specific sequence of the operator to which the first device belongs may be a PLMN (public land mobile network) ID, and the PLMN ID includes an MNC and an MCC. Certainly, it is only an example for description herein. Specific content of the specific sequence of the operator to which the first device belongs is not limited in the present invention.

Optionally, the scrambling code seed totally includes 31 bits. The specific sequence of the operator to which the first device belongs is represented as a k-bit binary number to be used as k bits of the scrambling code seed. Remaining bits of the scrambling code seed are 0, and k is an integer falling within a range of (0, 31]. Preferably, the k-bit binary number represented by using the specific sequence of the operator to which the first device belongs is used as first k bits or last k bits of the scrambling code seed.

Alternatively, optionally, the scrambling code seed is generated according to the specific sequence of the operator to which the first device belongs, a first seed, and a first algorithm. Further, optionally, the first seed is a cell-specific sequence or an original seed. The original seed is a scrambling code seed originally used for scrambling in the prior art. The first algorithm is an exclusive OR algorithm. Certainly, the first algorithm may be another algorithm. This is not limited in the present invention.

The exclusive OR algorithm is used as an example. Specifically, the scrambling code seed may be generated according to the specific sequence of the operator to which the first device belongs and a fourth formula. The fourth formula is $c_{init}=R_{ID}\oplus N_{ID}$, where $c_{init}$ is the scrambling code seed, $R_{ID}$ is the specific sequence of the operator to which the first device belongs, $N_{ID}$ is the first seed, and $\oplus$ represents an exclusive OR operation. Certainly, the scrambling code seed may be generated by using another operation. This is not limited in the present invention.

A cell ID is used as an example. Specifically, the scrambling code seed may be PLMN ID||cell ID ("||" represents connecting two specific serial numbers together), or the scrambling code seed may be MNC||cell ID. Certainly, the two ID combination manners are not limited to simply connecting together.

Certainly, the first device may obtain the scrambling code seed by other means, and the scrambling code seed is not necessarily generated by the first device. In addition, generation of the scrambling code seed by the first device is not limited to the foregoing manners. The scrambling code seed may be generated by means of another operation, as long as different operators can be distinguished by using different scrambling code seeds. A specific form of the scrambling code seed is not limited in the present invention.

Preferably, the first device may send the scrambling code seed to the second device. The scrambling code seed may be sent by means of a broadcast, and this is not limited in the present invention. Alternatively, a third party device may separately send the scrambling code seed to the first device and the second device.

302: The first device generates a scrambling code sequence according to the scrambling code seed.

Specifically, optionally, a first sequence is generated according to the scrambling code seed and a second formula, and the scrambling code sequence is generated according to the first sequence, a second sequence, and a third formula. The second formula is $c_{init}=\sum_{i=0}^{30}x(i)\cdot 2^i$, the second sequence is y(0)=1, y(m)=0, m=1, 2, . . . , 30, and the third formula is C(n)=(x(n+Nc)+y(n+Nc))mod 2.

In the present invention, mod 2 represents performing a modulo-2 operation on binary numbers. That is, no carry is produced during binary calculation. For example, "1+1=0", "0+1=1", and "0−1=1". n is an integer greater than or equal to 0, i is an integer falling within a range of [0, 30], m is an integer falling within a range of [1, 30], $c_{init}$ is the scrambling code seed, x(i) represents an $i^{th}$ bit of the first sequence, C(n) represents a value of an $n^{th}$ bit of the scrambling code sequence, Nc is a preset parameter, where preferably Nc=1600, and x(n+Nc) and y(n+Nc) respectively represent values of an $(n+Nc)^{th}$ bit of the first sequence and an $(n+Nc)^{th}$ bit of the second sequence. The first sequence and the second sequence satisfy the following equations:

$$x(n+31)=(x(n+3)+x(n+2)+x(n+1)+x(n)) \bmod 2$$

$$y(y+31)=(y(n+3)+y(n)) \bmod 2$$

x(n+31) and y(n+31) respectively represent values of an $(n+31)^{th}$ bit of the first sequence and an $(n+31)^{th}$ bit of the second sequence, and n is an integer greater than or equal to 0.

Certainly, the scrambling code sequence may be generated according to the scrambling code seed in another manner. An algorithm of generating the scrambling code sequence is not limited in the present invention.

303: The first device scrambles data according to the scrambling code sequence.

Preferably, the first device scrambles the data according to the scrambling code sequence and a first formula to obtain the scrambled data. The first formula is B(i)=(b(i)+c(i)) mod 2.

B(i) is a value of an $i^{th}$ bit of the scrambled data, b(i) is a value of an $i^{th}$ bit of the unscrambled data, c(i) is a value of an $i^{th}$ bit of the scrambling code sequence, and i is an integer greater than or equal to 0. Certainly, the first formula is used herein merely as an example for description, and data may be scrambled according to the scrambling code sequence in another manner. A specific scrambling algorithm is not limited in the present invention.

Optionally, the data may be a CRC (cyclic redundancy check) code. That is, the CRC check code may be scrambled according to the specific sequence of the operator to which the first device belongs or the scrambling code seed generated by the first device. Certainly, the data may be other control information or data information. This is not limited in the present invention.

Preferably, data on a PBCH (physical broadcast channel) in a subframe may be scrambled. Alternatively, other downlink and uplink data signals, reference signals or control signals may be scrambled. This is not limited in the present invention. Specifically, optionally, the downlink signal includes, but is not limited to a PDSCH (physical downlink shared channel), a PDCCH (physical downlink control channel), a PCFICH (physical control format indicator channel), a PMCH (physical multicast channel), a CRS (cell-specific reference signal), an EPDCCH (enhanced physical downlink control channel), a DM-RS (demodulation reference signal), a PRS (positioning reference signal), and a CSI-RS (channel state information-reference signal). The uplink signal includes, but is not limited to a PUSCH (physical uplink shared channel), a PUCCH (physical uplink control channel), an SRS (sounding reference signal), and a DM-RS (a demodulation reference signal for a physical uplink shared channel). Certainly, the several specific channels are only used as examples for description herein, and it does not represent that the present invention is limited thereto.

304: The second device obtains a scrambling code sequence.

Preferably, the second device receives the scrambling code sequence sent by the first device. Alternatively, the second device receives the scrambling code seed sent by the first device and generates the scrambling code sequence according to the scrambling code seed. Alternatively, the second device obtains a prestored scrambling code seed, and generates the scrambling code sequence according to the scrambling code seed. Certainly, the second device may obtain the scrambling code seed in another manner. This is not limited in the present invention.

Specifically, optionally, a process in which the second device generates the scrambling code sequence according to the scrambling code seed is the same as a process in which the first device generates the scrambling code sequence according to the scrambling code seed in step 302, and details are not described again herein.

305: The first device sends the scrambled data to the second device.

Optionally, the first device sends the scrambled data to the second device on the first time-frequency resource. The first time-frequency resource is a time-frequency resource shared by the operator to which the first device belongs and another operator. Because the first time-frequency resource may also be used by another operator, the second device may receive both the data of the operator to which the first device belongs and data of the another operator by using the first time-frequency resource. Moreover, the first device scrambles the data by using the scrambling code sequence that is generated according to the specific sequence of the operator to which the first device belongs. Correspondingly, the second device may correctly receive the data by performing descrambling by using the scrambling code sequence that is generated according to the specific sequence of the operator to which the first device belongs. However, the data of the another operator cannot be correctly descrambled and therefore can be directly discarded. In this way, a manner of performing scrambling by using a specific sequence of an operator, enables the second device to distinguish data sent by different operators.

306: The second device descrambles the scrambled data according to the scrambling code sequence.

According to the data transmission method provided in this embodiment of the present invention, data is scrambled by using a scrambling code sequence that is generated according to a specific sequence of an operator to which a first device belongs. In this way, user equipment performs descrambling according to the corresponding scrambling code sequence, and data of another operator cannot be correctly descrambled and therefore can be directly discarded. Data of different operators is distinguished. Therefore, a problem that user equipment cannot correctly parse data or measure a channel due to incapability of identifying different operators is resolved.

Figure 4:
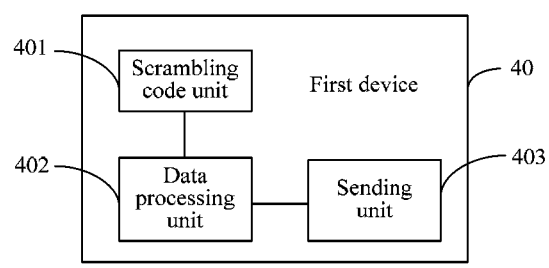
FIG. 4 is a schematic structural diagram of a first device according to an embodiment of the present invention.

Based on the embodiments that correspond to FIG. 1 and FIG. 3 above, an embodiment of the present invention provides a first device, to perform the data transmission method described in the embodiment that corresponds to FIG. 1 or FIG. 3 above. Referring to FIG. 4, the first device 40 includes a scrambling code unit 401, a data processing unit 402, and a sending unit 403. Optionally, the first device 40 is a base station or user equipment.

The scrambling code unit 401 is configured to obtain a scrambling code sequence, where the scrambling code sequence is generated according to a specific sequence of an operator to which the first device belongs.

The data processing unit 402 is configured to scramble data according to the scrambling code sequence obtained by the scrambling code unit.

The sending unit 403 is configured to send the data scrambled by the data processing unit.

Optionally, the scrambling code unit 401 is specifically configured to: generate a scrambling code seed according to the specific sequence of the operator to which the first device belongs, and generate the scrambling code sequence according to the scrambling code seed.

In an application scenario, the scrambling code unit 401 is further specifically configured to represent the specific sequence of the operator to which the first device belongs as a k-bit binary number to be used as k bits of the scrambling code seed, where remaining bits of the scrambling code seed are 0, the scrambling code seed totally includes 31 bits, and k is an integer falling within a range of (0, 31].

In another application scenario, the scrambling code unit 401 is further specifically configured to generate the scrambling code seed according to the specific sequence of the operator to which the first device belongs and a cell-specific sequence of the first device.

Optionally, the sending unit 403 is further configured to send the scrambling code seed.

Optionally, the data is a cyclic redundancy check code CRC.

Optionally, the specific sequence of the operator to which the first device belongs includes a mobile network code MNC and/or a mobile country code MCC.

Optionally, the data is data on a physical broadcast channel PBCH, a physical downlink shared channel PDSCH, a physical downlink control channel PDCCH, a physical control format indicator channel PCFICH, a physical multicast channel PMCH, a cell-specific reference signal CRS, an enhanced physical downlink control channel EPDCCH, a demodulation reference signal DM-RS, a positioning reference signal PRS, a channel state information-reference signal CSI-RS, a physical uplink shared channel PUSCH, a physical uplink control channel PUCCH, a sounding reference signal SRS, or a demodulation reference signal DM-RS for a physical uplink shared channel.

According to the first device provided in this embodiment of the present invention, data is scrambled by using a scrambling code sequence that is generated according to a specific sequence of an operator to which the first device belongs. In this way, user equipment performs descrambling according to the corresponding scrambling code sequence, and data of another operator cannot be correctly descrambled and therefore can be directly discarded. Data of different operators is distinguished. Therefore, a problem that user equipment cannot correctly parse data or measure a channel due to incapability of identifying different operators is resolved.

Figure 5:
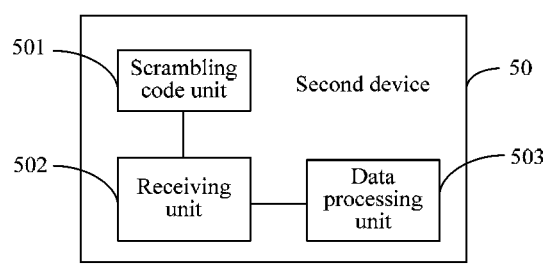
FIG. 5 is a schematic structural diagram of a second device according to an embodiment of the present invention.

Based on the embodiments that correspond to FIG. 2 and FIG. 3 above, an embodiment of the present invention provides a second device, to perform the data transmission method described in the embodiment that corresponds to FIG. 2 or FIG. 3 above. Referring to FIG. 5, the first device 50 includes a scrambling code unit 501, a receiving unit 502, and a data processing unit 503. Optionally, the second device 50 may be a base station or user equipment.

The scrambling code unit is configured to obtain a scrambling code sequence, where the scrambling code sequence is generated according to a specific sequence of an operator to which the second device belongs.

The receiving unit is configured to receive scrambled data.

The data processing unit is configured to descramble, according to the scrambling code sequence obtained by the scrambling code unit, the scrambled data received by the receiving unit.

Optionally, the scrambling code unit is specifically configured to: generate a scrambling code seed according to the specific sequence of the operator to which the second device belongs, and generate the scrambling code sequence according to the scrambling code seed.

Further, in an application scenario, the scrambling code unit is further specifically configured to represent the specific sequence of the operator to which the second device belongs as a k-bit binary number to be used as k bits of the scrambling code seed, where remaining bits of the scrambling code seed are 0, the scrambling code seed totally includes 31 bits, and k is an integer falling within a range of (0, 31].

In another application scenario, the scrambling code unit is further specifically configured to generate the scrambling code seed according to the specific sequence of the operator to which the second device belongs and a cell-specific sequence of the second device.

Optionally, the receiving unit is further configured to receive a scrambling code seed.

The scrambling code unit, is further configured to generate the scrambling code sequence according to the scrambling code seed received by the receiving unit.

Optionally, the data is a cyclic redundancy check code CRC.

Optionally, the specific sequence of the operator to which the second device belongs includes a mobile network code MNC and/or a mobile country code MCC.

Optionally, the data is data on a physical broadcast channel PBCH, a physical downlink shared channel PDSCH, a physical downlink control channel PDCCH, a physical control format indicator channel PCFICH, a physical multicast channel PMCH, a cell-specific reference signal CRS, an enhanced physical downlink control channel EPDCCH, a demodulation reference signal DM-RS, a positioning reference signal PRS, a channel state information-reference signal CSI-RS, a physical uplink shared channel PUSCH, a physical uplink control channel PUCCH, a sounding reference signal SRS, or a demodulation reference signal DM-RS for a physical uplink shared channel.

According to the second device provided in this embodiment of the present invention, received scrambled data is scrambled according to a scrambling code sequence that is generated according to a specific sequence of an operator to which the second device belongs. In this way, user equipment performs descrambling according to the corresponding scrambling code sequence, and data of another operator cannot be correctly descrambled and therefore can be directly discarded. Operators are distinguished. Therefore, a problem that user equipment cannot correctly parse data or measure a channel due to incapability of identifying different operators is resolved.

Figure 6:
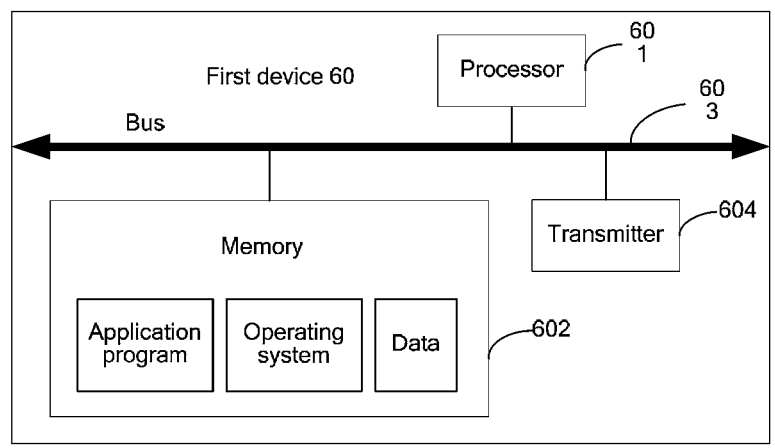
FIG. 6 is a schematic structural diagram of a first device according to another embodiment of the present invention.

Based on the embodiments that correspond to FIG. 1 and FIG. 3 above, another embodiment of the present invention provides a first device 60, to perform the data transmission method described in the embodiment that corresponds to FIG. 1 or FIG. 3 above. Preferably, the first device 60 may be a base station or user equipment. Referring to FIG. 6, the first device 60 includes: at least one processor 601, a memory 602, a bus 603, and a transmitter 604. The at least one processor 601, the memory 602, and the transmitter 604 are connected by using the bus 603 and complete communication between each other by using the bus 603.

The bus 603 may be an ISA (industry standard architecture) bus, a PCI (peripheral component interconnect) bus, an EISA (extended industry standard architecture) bus, or the like. The bus 603 may be classified into an address bus, a data bus, a control bus, and the like. For ease of representation, the bus in FIG. 6 is represented by using only one bold line, but it does not indicate that there is only one bus or only one type of bus.

The memory 602 is used for application program code for executing the solution of the present invention. The application program code for executing the solution of the present invention is stored in the memory, and is controlled and executed by the processor 601.

The memory may be a read-only memory (ROM) or a static storage device of another type that can store static information and an instruction; a random access memory (RAM) or a dynamic storage device of another type that can store information and an instruction; or an electrically erasable programmable read-only memory (EEPROM), a compact disc read-only memory (CD-ROM) or another optical disk storage, optical disc storage (including a compact disc, a laser disc, an optical disc, a digital versatile disc, a Blu-ray disc, or the like), a disk storage medium or another magnetic storage device, or any other medium that can be used to carry or store expected program code in a form of an instruction or a data structure and can be accessed by a computer, but is not limited thereto. These memories are connected to the processor by using the bus.

The processor 601 may be a central processing unit (CPU), or an application specific integrated circuit (ASIC), or one or more integrated circuits configured to implement this embodiment of the present invention.

The processor 601 is configured to invoke the program code in the memory 602. In a possible implementation manner, when the foregoing application program is executed by the processor 601, the following functions are implemented.

The processor 601 is configured to obtain a scrambling code sequence, and scramble data according to the scrambling code sequence, where the scrambling code sequence is generated according to a specific sequence of an operator to which the first device belongs.

The transmitter 604 is configured to send the data scrambled by the processor 601.

Optionally, the processor 601 is specifically configured to: generate a scrambling code seed according to the specific sequence of the operator to which the first device belongs, and generate the scrambling code sequence according to the scrambling code seed.

Further, optionally, in an application scenario, the processor 601 is further specifically configured to represent the specific sequence of the operator to which the first device belongs as a k-bit binary number to be used as k bits of the scrambling code seed, where remaining bits of the scrambling code seed are 0, the scrambling code seed totally includes 31 bits, and k is an integer falling within a range of (0, 31].

In another application scenario, the processor 601 is further specifically configured to generate the scrambling code seed according to the specific sequence of the operator to which the first device belongs and a cell-specific sequence of the first device.

Optionally, the transmitter 604 is further configured to send the scrambling code seed.

Optionally, the data is a cyclic redundancy check code CRC.

Optionally, the specific sequence of the operator to which the first device belongs includes a mobile network code MNC and/or a mobile country code MCC.

Optionally, the data is data on a physical broadcast channel PBCH, a physical downlink shared channel PDSCH, a physical downlink control channel PDCCH, a physical control format indicator channel PCFICH, a physical multicast channel PMCH, a cell-specific reference signal CRS, an enhanced physical downlink control channel EPDCCH, a demodulation reference signal DM-RS, a positioning reference signal PRS, a channel state information-reference signal CSI-RS, a physical uplink shared channel PUSCH, a physical uplink control channel PUCCH, a sounding reference signal SRS, or a demodulation reference signal DM-RS for a physical uplink shared channel.

According to the first device provided in this embodiment of the present invention, data is scrambled by using a scrambling code sequence that is generated according to a specific sequence of an operator to which the first device belongs. In this way, user equipment performs descrambling according to the corresponding scrambling code sequence, and data of another operator cannot be correctly descrambled and therefore can be directly discarded. Data of different operators is distinguished. Therefore, a problem that user equipment cannot correctly parse data or measure a channel due to incapability of identifying different operators is resolved.

Figure 7:
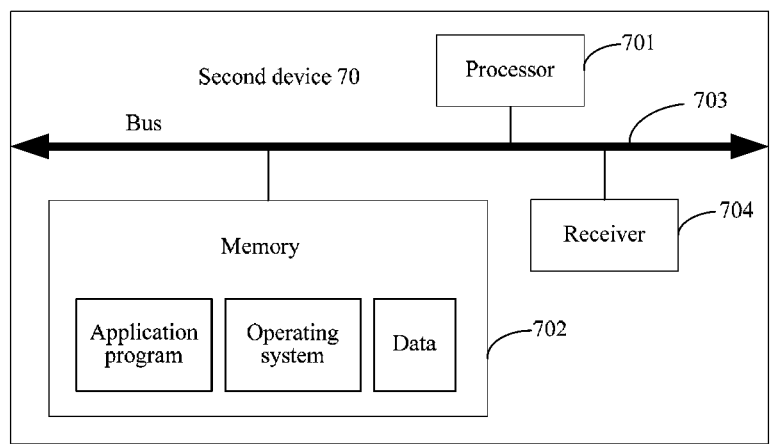
FIG. 7 is a schematic structural diagram of a second device according to another embodiment of the present invention.

Based on the embodiments that correspond to FIG. 2 and FIG. 3 above, another embodiment of the present invention provides a second device 70, to perform the data transmission method described in the embodiment that corresponds to FIG. 2 or FIG. 3 above. Preferably, the second device 70 may be a base station or user equipment. Referring to FIG. 7, the second device 70 includes: at least one processor 701, a memory 702, a bus 703, and a receiver 704. The at least one processor 701, the memory 702, and the receiver 704 are connected by using the bus 703 and complete communication between each other by using the bus 703.

The bus 703 may be an ISA (industry standard architecture) bus, a PCI (peripheral component interconnect) bus, an EISA (extended industry standard architecture) bus, or the like. The bus 703 may be classified into an address bus, a data bus, a control bus, and the like. For ease of representation, the bus in FIG. 7 is represented by using only one bold line, but it does not indicate that there is only one bus or only one type of bus.

The memory 702 is used for application program code for executing the solution of the present invention. The application program code for executing the solution of the present invention is stored in the memory, and is controlled and executed by the processor 701.

The memory may be a read-only memory (ROM) or a static storage device of another type that can store static information and an instruction; a random access memory (RAM) or a dynamic storage device of another type that can store information and an instruction; or an electrically erasable programmable read-only memory (EEPROM), a compact disc read-only memory (CD-ROM) or another optical disk storage, optical disc storage (including a compact disc, a laser disc, an optical disc, a digital versatile disc, a Blu-ray disc, or the like), a disk storage medium or another magnetic storage device, or any other medium that can be used to carry or store expected program code in a form of an instruction or a data structure and can be accessed by a computer, but is not limited thereto. These memories are connected to the processor by using the bus.

The processor 701 may be a central processing unit (CPU), or an application specific integrated circuit (ASIC), or one or more integrated circuits configured to implement this embodiment of the present invention.

The processor 701 is configured to invoke the program code in the memory 702. In a possible implementation manner, when the foregoing application program is executed by the processor 701, the following functions are implemented.

The processor 701 is configured to obtain a scrambling code sequence, where the scrambling code sequence is generated according to a specific sequence of an operator to which the second device belongs.

The receiver 704 is configured to receive scrambled data.

The processor 701 is further configured to demodulate, according to the obtained scrambling code sequence, the scrambled data received by the receiver 704.

Optionally, the processor 701 is specifically configured to: generate a scrambling code seed according to the specific sequence of the operator to which the second device belongs, and generate the scrambling code sequence according to the scrambling code seed.

Further, optionally, in an application scenario, the processor 701 is further specifically configured to represent the specific sequence of the operator to which the second device belongs as a k-bit binary number to be used as k bits of the scrambling code seed, where remaining bits of the scrambling code seed are 0, the scrambling code seed totally includes 31 bits, and k is an integer falling within a range of (0, 31].

In another application scenario, the processor 701 is further specifically configured to generate the scrambling code seed according to the specific sequence of the operator to which the second device belongs and a cell-specific sequence of the second device.

Optionally, the receiver 704 is further configured to receive a scrambling code seed.

The processor 701 is further configured to generate the scrambling code sequence according to the scrambling code seed received by the receiver 704.

Optionally, the data is a cyclic redundancy check code CRC.

Optionally, the specific sequence of the operator to which the second device belongs includes a mobile network code MNC and/or a mobile country code MCC.

Optionally, the data is data on a physical broadcast channel PBCH, a physical downlink shared channel PDSCH, a physical downlink control channel PDCCH, a physical control format indicator channel PCFICH, a physical multicast channel PMCH, a cell-specific reference signal CRS, an enhanced physical downlink control channel EPDCCH, a demodulation reference signal DM-RS, a positioning reference signal PRS, a channel state information-reference signal CSI-RS, a physical uplink shared channel PUSCH, a physical uplink control channel PUCCH, a sounding reference signal SRS, or a demodulation reference signal DM-RS for a physical uplink shared channel.

According to the second device provided in this embodiment of the present invention, received scrambled data is scrambled according to a scrambling code sequence that is generated according to a specific sequence of an operator to which the second device belongs. In this way, user equipment performs descrambling according to the corresponding scrambling code sequence, and data of another operator cannot be correctly descrambled and therefore can be directly discarded. Operators are distinguished. Therefore, a problem that user equipment cannot correctly parse data or measure a channel due to incapability of identifying different operators is resolved.

Figure 8:
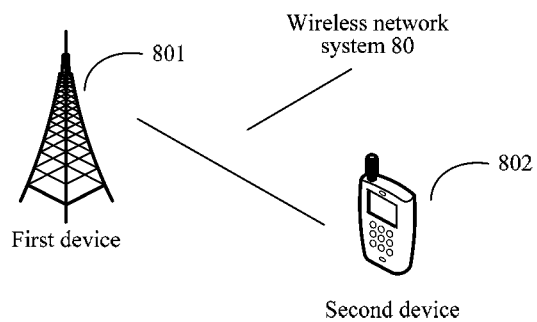
FIG. 8 is a schematic structural diagram of a wireless network system according to an embodiment of the present invention.

Based on the embodiment that corresponds to FIG. 3 above, an embodiment of the present invention provides a wireless network system 80, to perform the data transmission method described in the embodiment that corresponds to FIG. 3 above. Referring to FIG. 8, the wireless network system 80 includes a first device 801 and a second device 802. Preferably, the first device and the second device may be network side devices, for example, eNBs in an LTE system. Alternatively, the first device is a network side device, and the second device is user equipment. Alternatively, the first device and the second device are both user equipment. In this case, the first device and the second device communicate in a D2D (device to device) manner. Certainly, it is only an example for description herein, and it does not represent that the present invention is limited thereto. Graphics in FIG. 8 are only used to distinguish the first device 801 and the second device 802, but are not used to limit the devices.

The first device is the first device described in the embodiment that corresponds to FIG. 4, and the second device is the second device described in the embodiment that corresponds to FIG. 5.

Alternatively, the first device is the first device described in the embodiment that corresponds to FIG. 6, and the second device is the second device described in the embodiment that corresponds to FIG. 7.

According to the wireless network system provided in this embodiment of the present invention, data is scrambled by using a scrambling code sequence that is generated according to a specific sequence of an operator to which a first device belongs. In this way, user equipment performs descrambling according to the corresponding scrambling code sequence, and data of another operator cannot be correctly descrambled and therefore can be directly discarded. Data of different operators is distinguished. Therefore, a problem that user equipment cannot correctly parse data or measure a channel due to incapability of identifying different operators is resolved.

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following is taken as an example but is not limited: The computer readable medium may include a RAM (random access memory), a ROM (read-only memory), an EEPROM (electrically erasable programmable read-only memory), a CD-ROM (compact disc read-only memory) or other optical disk storage, a disk storage medium or other disk storage, or any other medium that can be used to carry or store expected program code in a command or data structure form and can be accessed by a computer. In addition, any connection may be appropriately defined as a computer-readable medium. For example, if software is transmitted from a website, a server or another remote source by using a coaxial cable, an optical fiber/cable, a twisted pair, a DSL (digital subscriber line) or wireless technologies such as infrared ray, radio and microwave, the coaxial cable, optical fiber/cable, twisted pair, DSL or wireless technologies such as infrared ray, radio and microwave are included in a definition of a medium to which they belong. For example, a disk and a disc used by the present invention includes a CD (compact disc), a laser disc, an optical disc, a DVD disc (digital versatile disc), a floppy disk and a Blu-ray disc, where the disk generally copies data by a magnetic means, and the disc copies data optically by a laser means. The foregoing combination should also be included in the protection scope of the computer-readable medium.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims. Additionally, statements made herein characterizing the invention refer to an embodiment of the invention and not necessarily all embodiments.

What is claimed is:

1. A data transmission method comprising:
   obtaining, by a first device, a scrambling code sequence by:
   generating, by the first device, a scrambling code seed according to a specific sequence of an operator to which the first device belongs, and
   generating, by the first device, the scrambling code sequence according to the scrambling code seed by representing the specific sequence of the operator to which the first device belongs as a k-bit binary number to be used as k bits of the scrambling code seed, wherein remaining bits of the scrambling code seed are 0, the scrambling code seed comprises 31 bits in total, and k is an integer between 1 and 31;
   scrambling, by the first device, data according to the scrambling code sequence, wherein scrambling the data distinguishes the data as being associated with the operator; and
   sending, by the first device, the scrambled data.

2. The method according to claim 1, wherein generating the scrambling code seed comprises:
   generating, by the first device, the scrambling code seed according to the specific sequence of the operator to which the first device belongs and a cell-specific sequence of the first device.

3. The method according to claim 1, wherein the method further comprises:
   sending, by the first device, the scrambling code seed.

4. The method according to claim 1, wherein the data is a cyclic redundancy check (CRC) code.

5. The method according to claim 1, wherein the specific sequence of the operator to which the first device belongs comprises a mobile network code (MNC) and/or a mobile country code (MCC).

6. The method according to claim 1, wherein the data is data on a physical broadcast channel (PBCH), a physical downlink shared channel (PDSCH), a physical downlink control channel (PDCCH), a physical control format indicator channel (PCFICH), a physical multicast channel (PMCH), a cell-specific reference signal (CRS), an enhanced physical downlink control channel (EPDCCH), a demodulation reference signal (DM-RS), a positioning reference signal (PRS), a channel state information-reference signal (CSI-RS), a physical uplink shared channel (PUSCH), a physical uplink control channel (PUCCH), a sounding reference signal (SRS), or a demodulation reference signal (DM-RS) for a physical uplink shared channel.

7. A first device comprising:
   a memory configured to store computer executable instructions;
   a processor configured to execute the computer executable instructions;
   a bus;
   a transmitter, wherein the processor, the memory, and the transmitter are connected to each other via the bus; wherein
   the processor is further configured, when executing the computer executable instructions, to obtain a scrambling code sequence by:
   generating a scrambling code seed according to a specific sequence of an operator to which the first device belongs, and
   generating the scrambling code sequence according to the scrambling code seed by representing the specific sequence of the operator to which the first device belongs as a k-bit binary number to be used as k bits of the scrambling code seed, wherein remaining bits of the scrambling code seed are 0, the scrambling code seed comprises 31 bits in total, and k is an integer between 1 and 31, and
   scrambling data according to the scrambling code sequence for distinguishing the data as being associated with the operator, and
   the transmitter is configured to cooperate with the processor to send the data scrambled by the processor.

8. The device according to claim 7, wherein the processor is further configured to generate the scrambling code seed according to the specific sequence of the operator to which the first device belongs and a cell-specific sequence of the first device.

9. The device according to claim 7, wherein the transmitter is further configured to send the scrambling code seed.

10. The device according to claim 7, wherein the first device is a base station or user equipment.

11. A second device comprising:
   a memory configured to store computer executable instructions;
   a processor configured to execute the computer executable instructions;
   a bus;
   a receiver, wherein the processor, the memory, and the receiver are connected to each other via the bus; wherein
   the processor is further configured, when executing the computer executable instructions, to:
   obtain a scrambling code sequence, wherein a scrambling code seed is generated according to a specific sequence of an operator to which the first device belongs, and the scrambling code sequence is generated according to the scrambling code seed by representing the specific sequence of the operator to which the second device belongs as a k-bit binary number to be used as k bits of the scrambling code seed, wherein remaining bits of the scrambling code seed are 0, the scrambling code seed comprises 31 bits in total, and k is an integer between 1 and 31;
   the receiver is configured to cooperate with the processor to receive scrambled data associated with the operator; and the processor is further configured to demodulate, according to the obtained scrambling code sequence, the scrambled data and, based on a successful demodulation, determine that the scrambled data is associated with the operator.

12. The device according to claim 11, wherein the processor is further configured to generate the scrambling code seed according to the specific sequence of the operator to which the second device belongs and a cell-specific sequence of the second device.

13. The device according to claim 11, wherein the receiver is further configured to cooperate with the processor to receive the scrambling code seed; and wherein the processor is further configured to generate the scrambling code sequence according to the scrambling code seed received by the receiver.

14. The device according to claim 11, wherein the second device is a base station or user equipment.

* * * * *